Patented Sept. 22, 1953

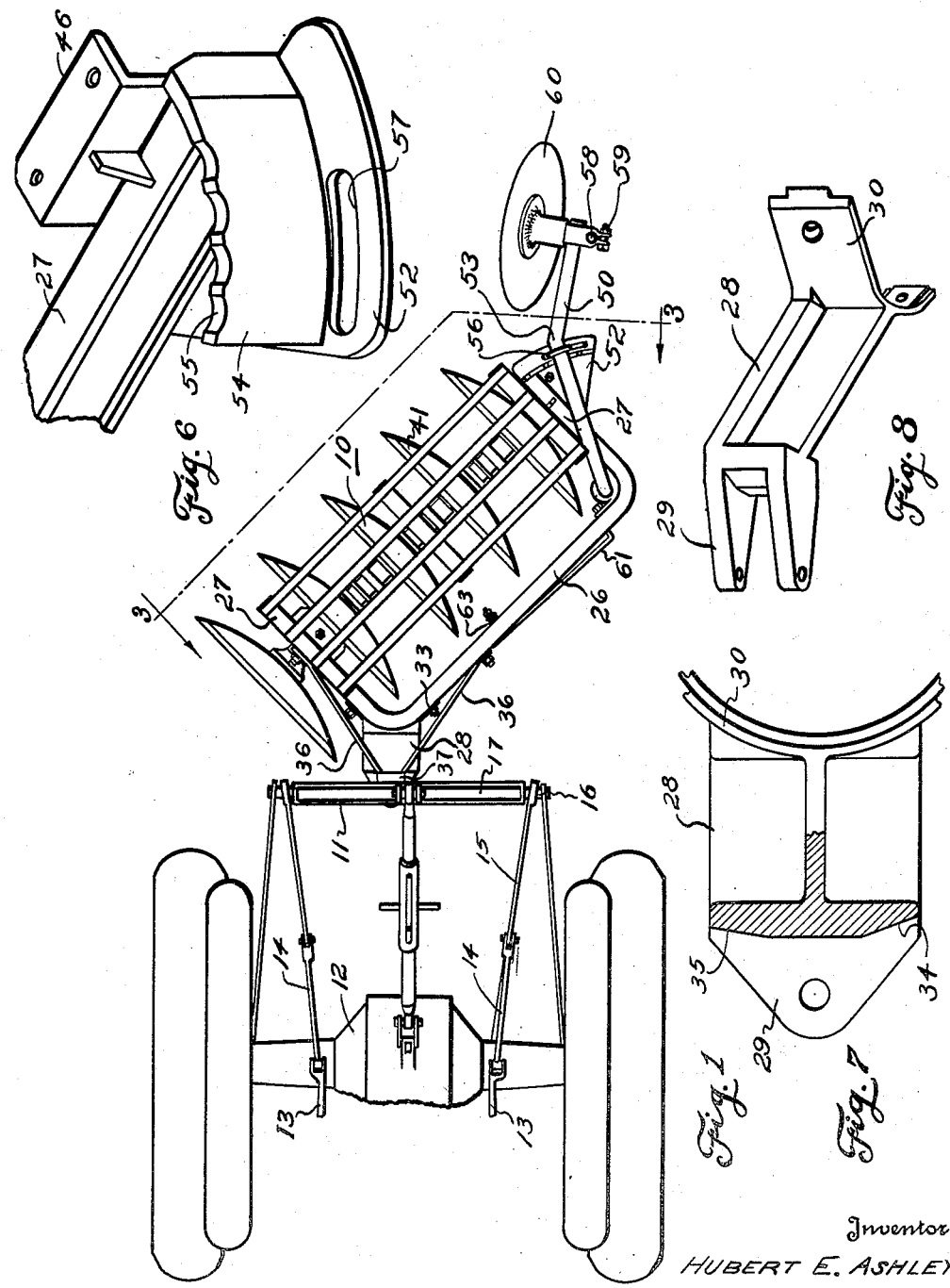

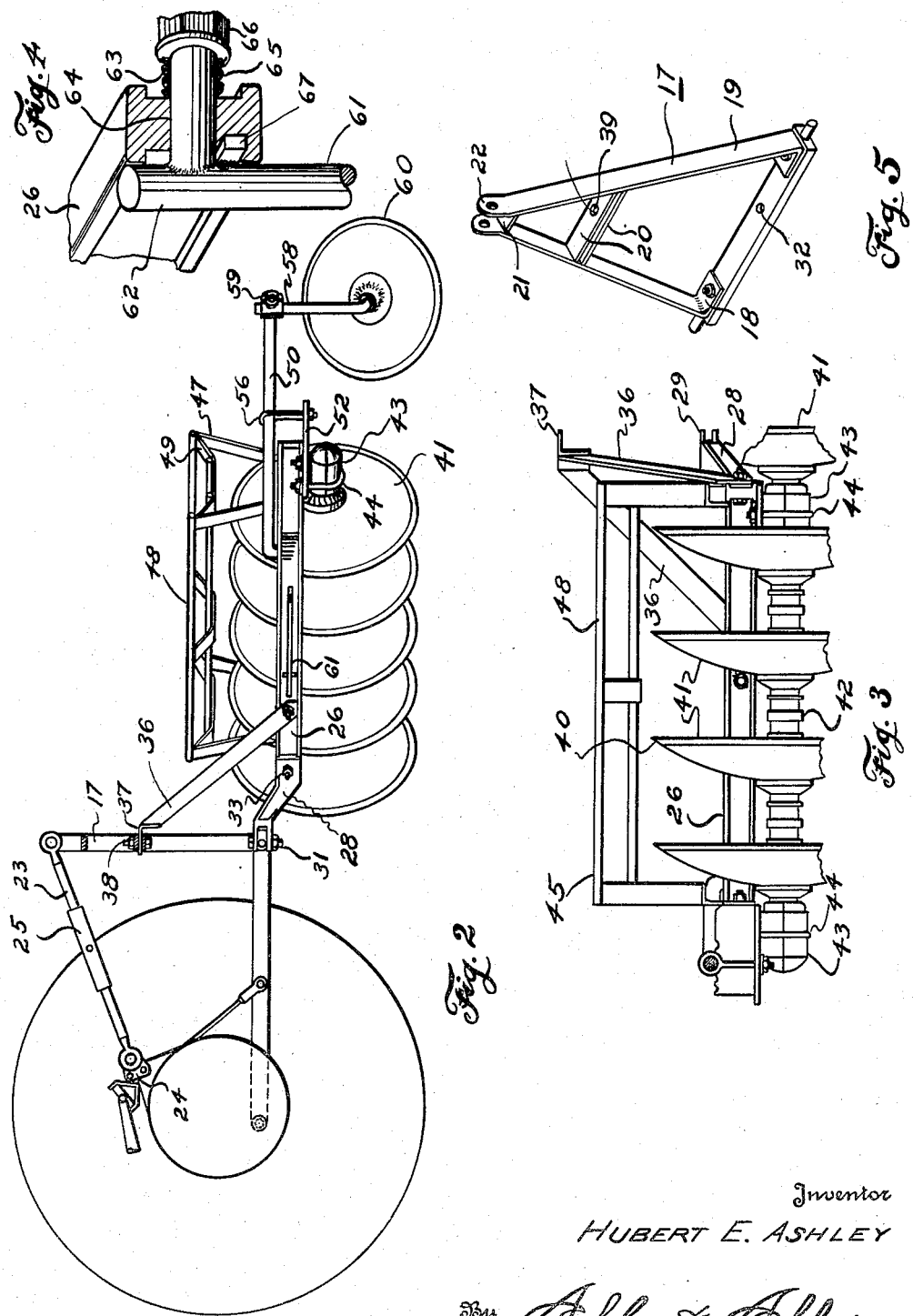

2,652,762

UNITED STATES PATENT OFFICE 2,652,762

ONE-WAY DISK PLOW

Hubert E. Ashley, Dallas, Tex.

Application October 6, 1948, Serial No. 53,059

2 Claims. (Cl. 97—47.5)

This invention relates to new and useful improvements in disc plows.

One object of the invention is to provide an improved disc plow which combines the advantages of the conventional moldboard and disc type and eliminates the objectionable features of the same.

Another object of the invention is to provide an improved disc plow which is of such construction that greater penetration of the disc blades is obtained by utilizing the suction or auger principle, with the desired penetration being obtained in unfavorable soils or conditions by means of added weight.

A further object of the invention is to provide an improved disc plow having a coulter or furrow wheel for supporting the disc blades in a substantially horizontal position, the wheel being adjustable universally to permit equalized distribution of the weight and load imposed upon the plow as well as for varying the draft of said disc blades.

A particular object of the invention is to provide an improved disc plow having an off-center connection with the drawbar of a tractor so as to utilize the pull of gravity for increasing and maintaining the penetration of the disc blades beyond that obtained by conventional weighted disc plows, the increased penetration being due to the balancing of the lateral thrust imposed upon the disc blades by the coaction of the off-center connection and the adjustable coulter wheel.

Still another object of the invention is to provide an improved plow, of the character described, which is of the quick-detachable, lift-type and has an adjustable link connection with the tractor for cooperating with the furrow wheel and permitting fine adjustments of the penetration of the disc blades, the adjustable link connection permitting the placing of pressure upon said furrow wheel so as to increase its traction and assist its coaction with the off-center connection in balancing the thrust exerted upon the disc blades.

A construction designed to carry out the invention will be hereinafter described together with other features of the invention.

The invention will be more readily understood from a reading of the following specification and by reference to the accompanying drawings wherein an example of the invention is shown, and wherein:

Fig. 1 is a plan view of a disc plow, constructed in accordance with the invention, and shown connected with a tractor, Fig. 2 is a side elevational view, showing the plow and its connection to the tractor, Fig. 3 is an elevational view of a portion of the plow, taken on the line 3—3 of Fig. 1, Fig. 4 is a detailed view, partly in section, of the mounting of the rest stand for supporting the forward portion of the plow when detached from the tractor, Fig. 5 is a perspective view of the A-frame for connecting the plow to the tractor, Fig. 6 is an enlarged perspective view, showing the bracket for supporting the furrow wheel in laterally adjusted positions, Fig. 7 is an underside plan view, partly in section, of the hitch for connecting the plow to the tractor, and Fig. 8 is a perspective view of the hitch.

In the drawings, the numeral 10 designates a disc plow of the one-way type which is adapted to be attached to the drawbar 11 of a tractor having a rear lift. The rear portion of the tractor is indicated generally by the numeral 12 and includes a pair of lifting levers 13 connected by links 14 to a pair of side arms 15 having their rear ends journaled upon pintles 16 which project from the ends of the drawbar 11. The foregoing comprise the elements of a conventional rear lift for a tractor and form no part of the present invention.

As is most clearly shown in Figs. 2 and 5, an upright A-frame 17 is secured to the drawbar by flanges 18 formed at the lower ends of its inclined legs 19 and bolted or otherwise fastened to said drawbar. A pair of spaced, horizontal bars 20 connect the intermediate portions of the legs 19, while the upper end portions of said legs are joined by a small plate 21. The latter are spaced from the upper extremities of the legs to provide ears or lugs 22 for pivotally supporting one end of an adjustable rod or link 23 which has its opposite or forward end pivoted to an ear 24 carried by the tractor. The rod 23 is in the nature of a turnbuckle and has its end sections adjustably connected by an intermediate telescoping sleeve 25 screw-threaded upon and connecting said rod sections. By turning the sleeve 25 relative to the ends of the rod 23, the A-frame may be swung in a limited vertical arc to permit fine adjustments in the position of said A-frame.

The plow 10 includes a horizontal, U-shaped frame or beam 26 which is of substantially I-shaped in cross-section and has a pair of parallel arms 27 horizontally alined with each other and with the main body of the frame. As shown in Fig. 1, the frame 26 is adapted to extend at an angle relative to the longitudinal axis of the tractor with its arms 27 directed rearwardly whereby one arm is disposed forwardly of the other and has its inner end adjacent the drawbar. A hitch 28, having a clevis 29 at one end and an arcuate fork or yoke 30 at its opposite end (Figs. 7 and 8) is provided for attaching the plow frame to the drawbar. The clevis 29 is offset upwardly relative to the yoke 30 of the hitch and is connected to the drawbar by a pin 31 which extends through an opening 32 formed in said drawbar preferably to the right of its center (Fig. 5). Suitable bolts 33 secure the yoke 30 of the hitch to the juncture of the frame with its forward leg, whereby an offset connection is provided for said frame so as to position the plow relatively close to the right-hand wheel of the tractor. Since this wheel normally rides in the furrow, the tractor is inclined and imposes a greater weight upon said wheel. Thus, the latter has greater traction than the left-hand wheel and acts to withstand the side thrust or draft of the plow. As shown by the numerals 34 and 35 in Figs. 7 and 8, the inner, upright surface of the clevis has its end portions bevelled to permit limited pivoting of the hitch 28 relative to the drawbar and the left-hand portion 34 preferably has a greater bevel than the right-hand portion 35. A pair of flat bars or straps 36 extend between and pivotally connect the forward portions of the frame and its front arm to the bars 20 of the A-frame. The straps 36 are inclined upwardly from the plow frame and have their forward ends connected by an angular lug 37 which is fastened by a bolt and nut 38 to the bars 20 so as to provide an upper hitch or connection for said plow frame. Openings 39 are formed in the bars in vertical alinement with the opening 32 for receiving the bolt 38. Manifestly, the A-frame and the plow are lifted or swung upwardly by raising of the drawbar 11 and the lifting levers 13 due to the adjustable link 23 which connects the upper end of said A-frame to the tractor and the upper hitch or connection between said plow and A-frame.

A disc assembly 40 extends longitudinally of the frame 26 and includes a plurality of dished disc blades 41 mounted upon a shaft 42 in spaced relation. The shaft 42 is journaled in suitable bearings 43 which are supported by U-bolts 44 depending from the intermediate portions of the frame arms. It is noted that the forward end of the shaft projects through its bearing and that the forwardmost disc blade 41 is carried by said projecting shaft end ahead of the front arm. A weight rack or platform 45 is carried by the frame so as to cause penetration of the disc blades into hard or springy soils. Although the construction of the rack 45 is subject to variation, the same preferably includes an angle bar 46 secured to and extending lengthwise of each frame arm (Fig. 6). An upwardly and outwardly flared end member or open bracket 47 is carried by each angle bar and has longitudinal rods 48 welded or otherwise secured to its upper cross bar 49 which is preferably arced or bowed downwardly (Fig. 2). When desirable or necessary, suitable weights (not shown) may be supported upon the rack 45 so as to increase the weight of the plow and obtain penetration of the disc blades.

For supporting the rear portion of the frame, an angular, horizontal shaft or cylindrical arm 50 extends rearwardly of said frame at an angle and has its forward end bent downwardly and rotatably supported within a bearing 51 secured to the frame adjacent its rear arm. A triangular plate or bracket 52 is carried by the end portion of the rear frame arm to support the intermediate portion of the shaft 50. Rearwardly of the bracket, the shaft is bent laterally upon itself as shown by the numeral 53 to provide a portion extending substantially longitudinally of the tractor. An arcuate plate 54, having recesses or indentations 55 in its upper surface, projects upwardly from the bracket 52 adjacent its rear margin (Fig. 6). The shaft is adapted to engage within one of the recesses 55 and is held in such engagement by an eye-bolt and nut 56, which bolt extends through an arcuate slot 57 formed in the bracket externally of the plate 52. An angular axle or spindle 58 depends from the outer end of the shaft, being secured thereto in an adjusted position by a suitable clamp 59. The spindle 58 extends substantially vertical and has its lower end bent upon itself with a furrow wheel 60, preferably of the coulter type, journaled thereupon.

In order to support the forward portion of the frame when the plow is detached from the tractor, a retractable rest stand 61 is carried by the main body of said frame adjacent its forward arm. As shown in Fig. 4, the rest stand 61 includes a cylindrical rod or leg 62 having an arm or pin 63 projecting laterally therefrom adjacent one end and extending through an opening 64 in the web of the frame. A coiled spring 65 is confined upon the pin 63 by a suitable nut 66 for urging the rod 62 inwardly against the outer surface of the frame. When the rest stand is swung or pivoted downwardly upon its pin, the lower end of the rod engages the ground and coacts with the furrow wheel to support the frame in a substantially horizontal position. A transverse lug or short bar 67 is carried by the rod adjacent the pin for engaging within the frame web and against its lower flange so as to resist upward pivoting of the rest stand and thereby maintain the same in its extended position.

In operation, the frame 26 of the plow is attached to the drawbar 11 and the bars 20 of the A-frame by the hitch 28 and the angular lug 37 of the upper hitch. This connection is off-center so as to properly position the plow relative to the tractor for balancing the lateral thrust exerted against the disc blades. The elevation and inclination of the furrow wheel 60 is adjusted by means of the clamp 59, while the angular relation of said wheel to the longitudinal axis of the tractor is controlled by the position of the angular shaft 50. By loosening the eye-bolt 56, the arm 50 may be swung relative to the plate 54 and engaged with any one of the recesses 55 to obtain the desired angularity. Manifestly, such adjustment varies the draft of the disc blades 41. In the field, fine adjustments may be made by the rod or link 23 in accurately levelling the plow without dismounting from the tractor. Due to the provision of the A-frame 17 and the double connection of the plow frame thereto, the entire plow is lifted by raising of the levers 13 and may be re-engaged with the ground without the necessity of the readjusting said plow. Obviously, this arrangement facilitates turning of the plow as well as the transporting of the same. Suitable weights may be placed upon the rack 45 to increase the penetration of the disc blades whenever desirable or necessary, such as in hard, tough or spongy soils.

Due to the off-center connection of the plow frame to the drawbar of the tractor, that is, to the right of center, the forward disc blade is disposed adjacent the right-hand wheel of said tractor. Since the latter rides in the furrow, it is only necessary for the forward disc blade to make a relatively narrow cut and the lateral thrust or draft exerted upon said blade is minimized. Thus, the major portion of this thrust is distributed between the remaining or trailing blades instead of being concentrated upon the leading blade, whereby the desired penetration of said blades is maintained without the usual tendency of same to straighten out and ride out of the ground. With the lateral thrust properly balanced, the disc blades function in the manner of an auger and their penetration is maintained due to the suction created. This balancing of the lateral thrust is assisted by the furrow wheel which is adjusted to obtain the angularity necessary for the desired penetration. Of course, the penetration obtained is governed by the character and condition of the soil; however, optimum results may be obtained by the proper adjustment of the furrow wheel. The effectiveness of this wheel varies in accordance with its traction which may be increased by additional pressure. Such pressure may be obtained by extending or lengthening the adjustable link so as to pivot the A-frame rearwardly about the pins of the drawbar 11 which is relatively fixed against movement. Due to the upper hitch or connection between the A-frame and plow, the pivotal movement raises the forward end of said plow relative to its rear end and its furrow wheel. Thus, additional pressure is placed upon the wheel so as to increase its traction and thereby its effectiveness. Also, excessive penetration of the leading blade is prevented by raising of the forward end of the plow.

What I claim and desire to secure by Letters Patent is:

1. A plow for attachment to a tractor having a rear lift including, an upright A-frame having a horizontal drawbar at its lower end pivotally connected to the tractor lift whereby the drawbar and A-frame may pivot about a horizontal axis, an angular frame, an adjustable furrow wheel supporting the rear portion of the angular frame, a plurality of disc blades carried by said angular frame, a hitch secured to the forward portion of said angular frame and pivotally attached to the drawbar, bars fastened to the forward portion of said angular frame and pivotally attached to the intermediate portion of said A-frame, the hitch and bars being pivotal about an upright axis to permit said angular frame to undergo pivotal movement transversely of the drawbar and A-frame, and a link pivotally connected to the tractor and the upper end of said A-frame for limiting pivotal movement of the latter, the link being adjustable in length to pivot said A-frame and raise and lower the forward portion of the angular frame for varying the pressure upon the furrow wheel and the penetration of the disc blades.

2. A plow for attachment to a tractor having a rear lift and a pivotally connected horizontal drawbar movable with the lift including, an angular frame having its forward portion connected to the drawbar, a furrow wheel supporting the rear portion of the angular frame, a plurality of disc blades carried by said angular frame, an A-frame secured to the drawbar and projecting upwardly therefrom, connecting means extending between the forward portion of said angular frame and the A-frame above the drawbar, an adjustable link pivotally connecting the upper portion of said A-frame to the tractor, whereby said frames may undergo limited pivotal movement with the drawbar relative to the tractor and its lift upon movement of the lift, said A-frame being pivoted by adjustment of the link to raise and lower the forward portion of said angular frame for varying the pressure upon the furrow wheel and the penetration of the disc blades, a hitch mounted on the forward end portion of the angular frame for connecting said angular frame to the drawbar, the hitch and connecting means being pivotally attached to the drawbar and A-frame for pivotal movement about an upright axis whereby said angular frame may undergo lateral pivotal movement.

HUBERT E. ASHLEY.

References Cited in the file of this patent

UNITED STATES PATENTS

| Number | Name | Date |
|---|---|---|
| 1,888,876 | Mahon | Nov. 22, 1932 |
| 2,225,253 | Byer | Dec. 17, 1940 |
| 2,320,141 | Kott | May 25, 1943 |
| 2,322,342 | Bunn | June 22, 1943 |
| 2,392,903 | Currie | Jan. 15, 1946 |
| 2,394,210 | Sherman | Feb. 5, 1946 |
| 2,462,588 | Wondra | Feb. 22, 1949 |
| 2,467,111 | Coon | Apr. 12, 1949 |